United States Patent [19]
Hennessey et al.

[11] Patent Number: 5,703,969
[45] Date of Patent: *Dec. 30, 1997

[54] SYSTEM AND METHOD FOR RECOGNIZING VISUAL INDICIA

[75] Inventors: A. Kathleen Hennessey; YouLing Lin; Howard V. Hastings, III; Jerome R. Lovelace, all of Lubbock, Tex.; Ning San Chang, Sunnyville, Calif.

[73] Assignees: Texas Instruments Incorporated, Dallas, Tex.; Electroglas, Inc., Santa Clara, Calif.; Texas Tech University, Lubbock, Tex.

[*] Notice: The term of this patent shall not extend beyond the expiration date of Pat. No. 5,553,168.

[21] Appl. No.: 602,998

[22] Filed: Feb. 16, 1996

Related U.S. Application Data

[63] Continuation of Ser. No. 185,610, Jan. 21, 1994, Pat. No. 5,553,168.

[51] Int. Cl.⁶ ............................................. G06K 9/36
[52] U.S. Cl. .................. 382/276; 382/141; 382/282; 356/394
[58] Field of Search ....................... 382/276, 141, 382/282; 356/394

[56] References Cited

U.S. PATENT DOCUMENTS

| | | | |
|---|---|---|---|
| 4,579,455 | 4/1986 | Levy et al. ................................ | 356/394 |
| 4,907,285 | 3/1990 | Nakano et al. .......................... | 382/48 |
| 4,995,062 | 2/1991 | Terui ....................................... | 382/8 |
| 5,144,683 | 9/1992 | Suzuki et al. ........................... | 382/16 |
| 5,220,621 | 6/1993 | Saitoh ..................................... | 382/22 |
| 5,321,770 | 6/1994 | Huttenlocher et al. ................. | 382/22 |

OTHER PUBLICATIONS

Kwang-Soo Hahn, "Investigation of a Fuzzy Grammar for Automated Visual Inspection,"—Dissertation in Interdisciplinary Engineering Graduate Faculty, Texas Tech University, Dec. 1990.

Youling Lin, "Techniques for Synatactic Analysis of Images with Application for Automatic Visual Inspection"—Dissertation in Business Administration, Graduate Faculty, Texas Tech University, Dec. 1990.

*Primary Examiner*—Jose L. Couso
*Assistant Examiner*—Anh Hong Do
*Attorney, Agent, or Firm*—Robert L. Troike; W. James Brady, III; Richard L. Donaldson

[57] ABSTRACT

A method involves capturing visual indicia as a digital image, isolating the visual indicia on the digital image, converting the visual indicia to image primitives, identifying and presenting the visual indicia. An apparatus contains a camera for capturing a visual image, a video-to-digital converter, and a computer with a processor, appropriate memory, and software.

9 Claims, 4 Drawing Sheets

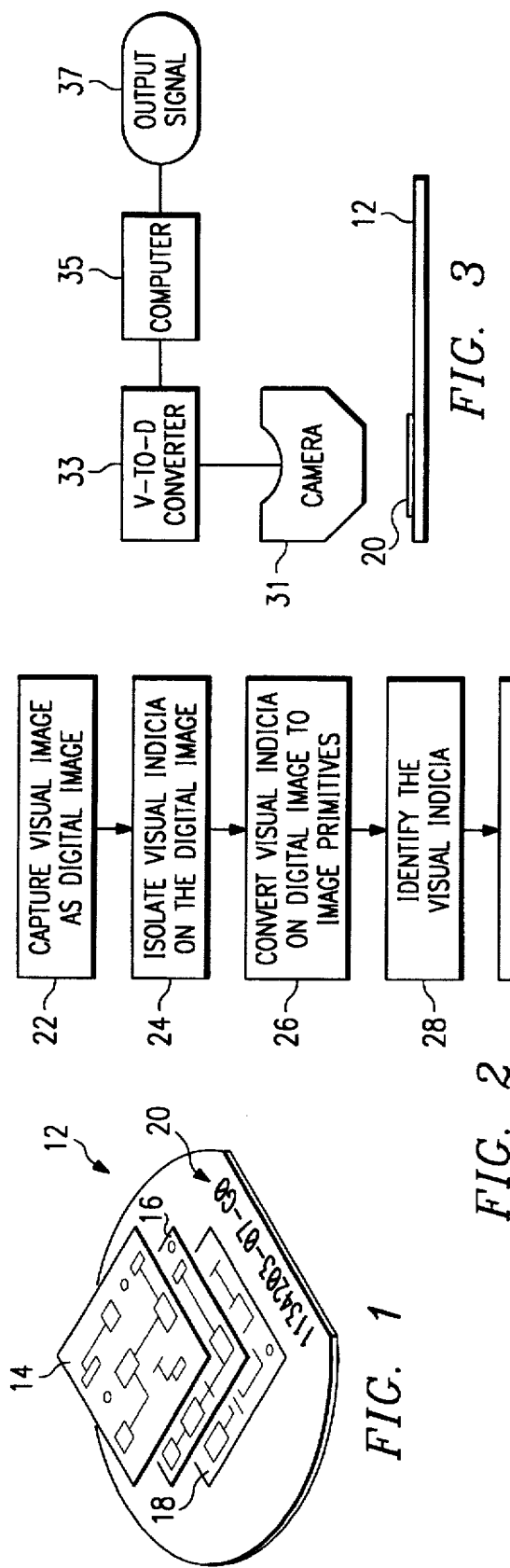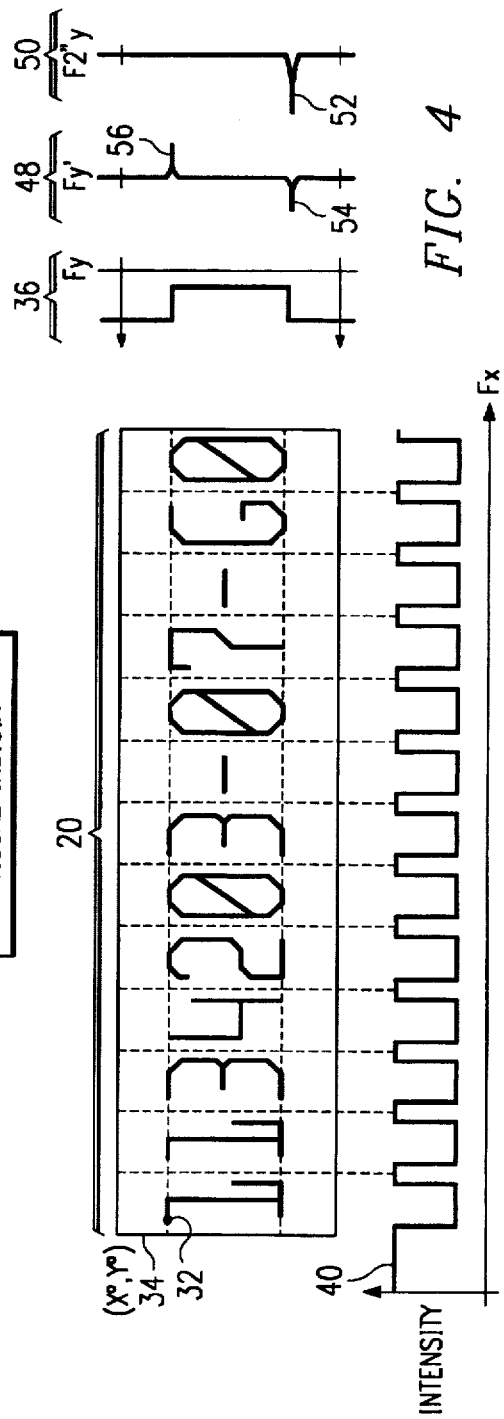

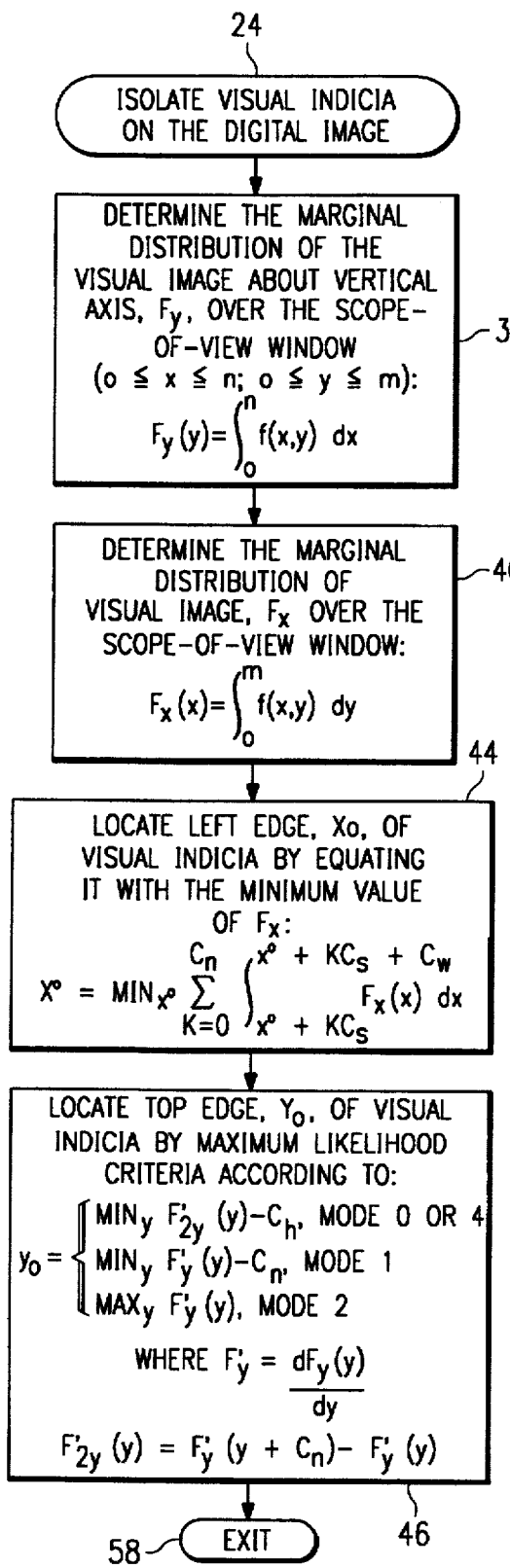
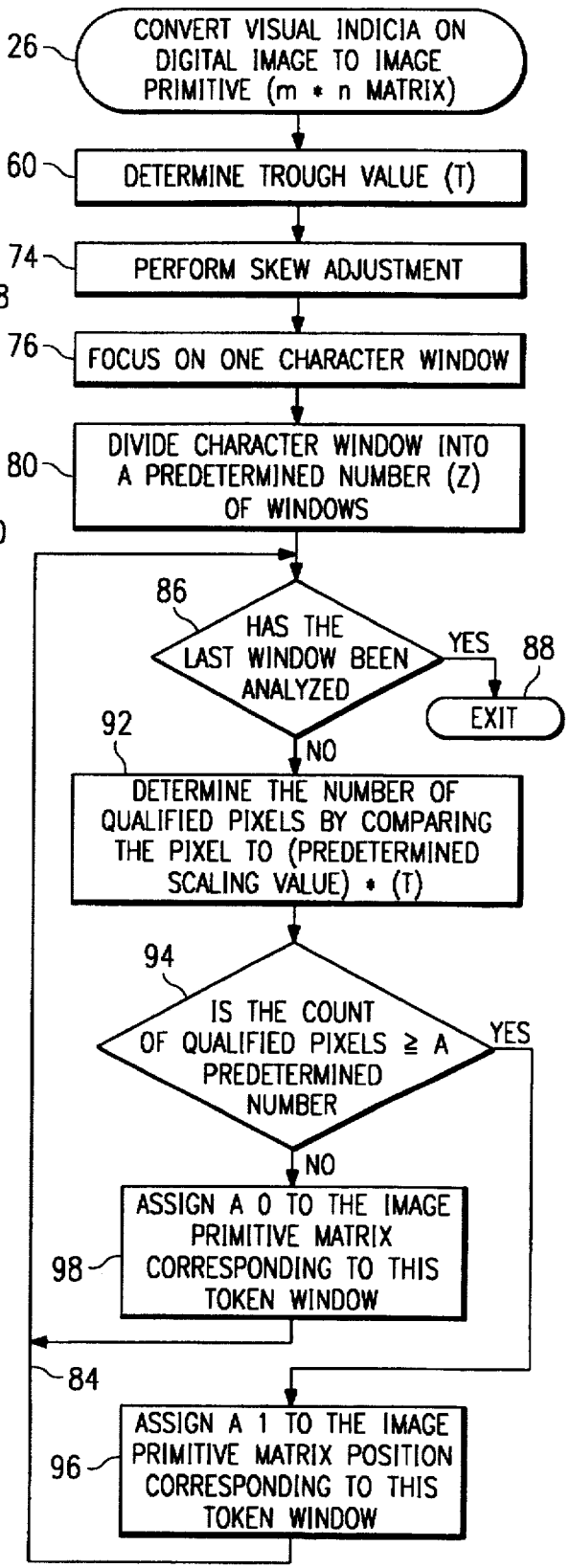
FIG. 5
FIG. 6

SYSTEM AND METHOD FOR RECOGNIZING VISUAL INDICIA

This is a continuation of application Ser. No. 08/185,610, filed Jan. 21, 1994, now U.S. Pat. No. 5,553,168.

RELATED APPLICATION

This patent application is related to copending patent application Ser. No. 08/186750 filed Jan. 21, 1994, now U.S. Pat. No. 3,515,453 entitled *Apparatus and Method for Image Processing in Symbolic Space*, incorporated herein by reference.

TECHNICAL FIELD OF THE INVENTION

This invention relates to imaging, and more particularly, relates to the recognition of visual indicia on a selected background.

BACKGROUND OF THE INVENTION

In various applications it is frequently desirable to have a machine which can recognize and read visual indicia. For example, at many airports, the license plates of automobiles entering the airport are read and entered by a computer. For another example, it is desirable to have a machine read visual indicia in connection with the fabrication and processing of integrated circuits.

During fabrication of an integrated circuit on a semiconductor wafer, it is desirable to be able to track each wafer through the various steps in the fabrication process. For this purpose, a unique identifier is often assigned to each wafer to allow for such tracking. The identifier may have multiple alphanumeric characters in a wide variety of fonts. It is frequently desirable to have a machine read the identifier. For example, in a closed lid process, it may be desirable to have a machine read the identifier and download the appropriate recipe for fabrication of the specific wafer based on the lot number associated with the identifier.

One approach to having a machine read the identifier on a wafer has been to use a pixel-by-pixel comparison of the identifier with a stored set of bit maps for each possible character which may be used to form the identifier. This approach often requires large amounts of computer memory and a multitude of comparisons in order to identify each character of the identifier. Because of the large memory requirement and the large number of comparisons required to identify each character, additional expensive hardware is often required to allow the machine to recognize and read the characters in a reasonable time period.

SUMMARY OF THE INVENTION

A need has arisen for an apparatus and method for recognizing and reading visual indicia such as identifier without generally requiring a large computer memory or the use of additional expensive hardware. In accordance with the present invention, an apparatus and method are provided that allow a machine to read visual indicia with a minimal number of comparisons and minimal memory requirements and to substantially eliminate disadvantages and problems associated with previous systems.

According to one aspect of the present invention, visual indicia are captured and converted to a digital image. The visual indicia on the digital image is isolated and converted to image primitives, and then compared with grammar tokens of grammar primitives in a grammar token database representing known characters to find the set of grammar tokens that are most similar to the image primitives of the visual indicia. The most similar set of grammar tokens is then identified as the visual indicia. According to another aspect of the present invention, if the most similar grammar token does not have a predetermined similarity to the visual indicia, the visual indica may be identified by a user and added to the grammar token database.

According to another aspect of the present invention, an apparatus is provided having a camera for capturing a visual image containing visual indicia such as alphanumeric characters, a converter for converting the visual image to a digital image, and a processor and a memory for converting the digital image into image primitives and comparing the image primitives to grammar tokens or grammar primitives representing known visual indicia stored in the memory. The most similar set of grammar tokens are determined, and the visual indicia corresponding to that set of grammar tokens is identified as the visual indicia.

A technical advantage of the present invention is that the number of comparisons required to identify visual indicia is substantially reduced.

Another technical advantage of the present invention is that it requires less computer memory than most conventional techniques for recognizing and reading alphanumeric characters.

A further technical advantage of the present invention is its ability to learn new visual indicia.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic representation, in section and elevation with portions broken away, of a semiconductor wafer with layers of an integrated circuit and an identifier shown thereon;

FIG. 2 is a block diagram of the present invention showing steps that may be used to allow a machine read to a visual indicia or identifier;

FIG. 3 is a schematic diagram of one aspect of the present invention;

FIG. 4 shows a scope-of-view window in which appears an enlarged plan view of the identifier shown in FIG. 1;

FIG. 5 is a block diagram showing steps that may be used to isolate visual indicia on a digital image in accordance with the present invention;

FIG. 6 is a block diagram showing steps that may be used to convert the visual indicia on the digital image to image primitives in accordance with the present invention;

DETAILED DESCRIPTION OF THE INVENTION

Figure 7:
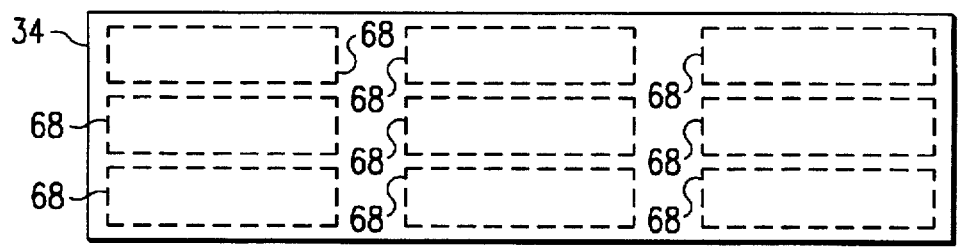
FIG. 7 shows the scope-of-view window of FIG. 4 with nine sample sites shown with phantom lines.

The present invention and its advantages are best understood by referring to FIGS. 1 through 11 of the drawings, like numerals being used for like corresponding parts of the various drawings.

Referring to FIG. 1, there is shown a semiconductor wafer 12. Wafer 12 may be formed from silicon. In the fabrication process, a stepper camera (not shown) may be used in a photolithography process to fabricate a series of layers 14, 16, and 18 of an integrated circuit on wafer 12. Layers 14 through 18 may be formed through the use of selective photoresist and doping compounds. A given layer, such as 14, may represent numerous steps in the fabrication process. Silicon wafer 12 is shown with a thirteen character identifier 20. Various combinations of alphanumeric characters may be satisfactorily used with the present invention as identifiers.

Identifier 20 allows wafer 12 to be tracked as it progresses through the fabrication process. Identifier 20 may be in the form of SEMI font characters as is standard in the art of fabricating integrated circuits, but other font systems may be satisfactorily used with the present invention. Any visual indicia or markings may be used for identifier 20. The present invention may be used in the fabrication process to allow a machine to read identifier 20 and to store information about wafer 12 or recall information, such as a recipe, that may be needed for a particular step in the fabrication process for that particular wafer 12.

The basic steps that may be used to read (scan and identify) visual indicia on an item, e.g., identifier 20 on wafer 12, are depicted in the flow chart of FIG. 2. The basic steps are as follows:

Step 1 (block 22): capture a visual image containing visual indicia, e.g., of identifier 20, as a digital image;

Step 2 (block 24): isolate the visual indicia on the digital image;

Step 3 (block 26): convert the visual indicia to image primitives or image tokens;

Step 4 (block 28) compare the visual indicia with known visual indicia in a grammar database and select the closest match; and Step 5 (block 30) present the identified visual indicia.

Primitives are basic building blocks for representing data in a compressed format. For example, a two-dimensional circle may be represented by two primitives: one representing the center point and one representing the radius. Thus, if a circle is to be stored in memory for comparison purposes, it does not have to be stored as a bit map, but may be stored as a 1*2 matrix.

Referring to FIG. 3, the first basic step (block 22) of capturing the visual image that contains the visual indicia of identifier 20 as a digital image may be accomplished by using a camera 31 and a video-to-digital converter 33. For example, a charge coupled device (CCD) camera, e.g., SONY X57C, may be used to capture the visual image. The CCD camera may be coupled to a video digitization board, e.g., True Vision Targat Board, to convert the visual image to a digital image. The digital image may then be received by a computer 35 with a processor, appropriate memory and software to accomplish the remaining steps shown in FIG. 2.

The second basic step (block 24) requires that the digital image of the visual indicia 20 on wafer 12 be isolated. To accomplish this, a scope-of-view window 34 is centered over the visual indicia of identifier 20, as shown in FIG. 4. Identifier 20 for silicon wafer 12 may be in a SEMI font which has standard character width, $C_w$, character height, $C_h$, and character spacing, $C_s$. Thus, by locating a reference point, e.g., the upper left-hand corner 34 ($x^0, y^0$) of the image, the remaining portion of identifier 20 may be determined. Statistics and differential equations may be used to locate the upper left-hand corner 34 of identifier 20. The visual image of the identifier is designated $Y=f(x,y)$ over the scope-of-view window 34 ($0 \leq x \leq n; 0 \leq y \leq m$), where the X axis is horizontal and the Y axis is vertical.

To locate corner 34, the marginal distribution about the Y axis, $F_y$, is determined (block 38 of FIG. 5) according to the equation:

$$F_y(y) = \int_0^n f(x,y)dx \tag{1}$$

A schematic plot of the ideal marginal distribution $F_y$ is designated 36 in FIG. 4. Similarly, the marginal distribution about the X axis, $F_x$, is determined (block 40 of FIG. 5) according to the equation:

$$F_x(x) = \int_0^m f(x,y)dy \tag{2}$$

A schematic plot of the ideal marginal distribution $F_x$ is designated 42 in FIG. 4. The x position of corner 34 may then be determined (block 44 of FIG. 5) by determining the minimum x value for the visual image according to the equation:

$$X^0 = Min_{x^0} \sum_{K=0}^{C_h} \int_{x^0+(K*C_s)}^{x^0+(K*C_s)+C_w} Fx(x)dx \tag{3}$$

The y value of corner 34 is determined (block 46 of FIG. 5) using maximum likelihood criteria. See generally, William Mendhall, Richard Scheaffer, and Dennis Wackery, *Mathematical Statistics with Applications* (1981), which is incorporated herein for all purposes. In step 46, the first derivative of the marginal distribution $F_y$ is determined according to the equation:

$$F'_y(y) = \frac{dF_y(y)}{dy} \tag{4}$$

Next, an intermediate equation is defined as follows:

$$F_{2y}(y) = F_y(y+C_h) - F_y(y) \tag{5}$$

If the visual image of identifier 20 is perfect, the plot of $F'_y$ will appear as shown by schematic plot 48 in FIG. 4 and $F''_{2y}$ will appear as shown by schematic plot 50 in FIG. 4. Once $F_y$, $F'_y$, and $F'_{2y}$ are determined, the y value, $y^0$, of corner 34 may determined using maximum likelihood criteria according to the equation:

$$y^0 = \begin{cases} Min_y F_{2y}(y) - C_h & \text{Mode 0 or 4} \\ Min_y F_y(y) - C_h & \text{Mode 1} \\ Max_y F_y(y) & \text{Mode 2} \end{cases} \tag{6}$$

Mode 0 is designated by reference numeral 52, mode 1 is designated by reference numeral 54, and mode 2 is designated by reference numeral 56 in FIG. 4. Once this corner (Xhd 0, $F_0$) is located, the known character dimensions and general orientation allow all of identifier 20 to be located. Having isolated the visual image of visual indicia 20 (block 58 of FIG. 5), the next step of FIG. 2 is considered.

Another basic step (block 26) in a process of the present invention is to convert the isolated visual image into image primitives or tokens.

Referring to FIG. 6, the basic steps that may be used to convert visual indicia for identifier 20 of the digital image to image primitives is shown. A first step (block 60) in the conversion is to determine a trough value 62. See FIG. 8. This aspect of the conversion involves a statistical analysis of scope-of-view window 34 to separate visual indicia 20 from the background. The trough may be thought of as representing an intermediate point between the most frequent intensity of background 70 and most frequent intensity 72 of visual indicia 20, where intensity may be measured on a gray scale of 0–255. To determine the trough value (T) 62, a histogram for the intensity of the scope-of-view window 34 may be determined.

Figure 8:
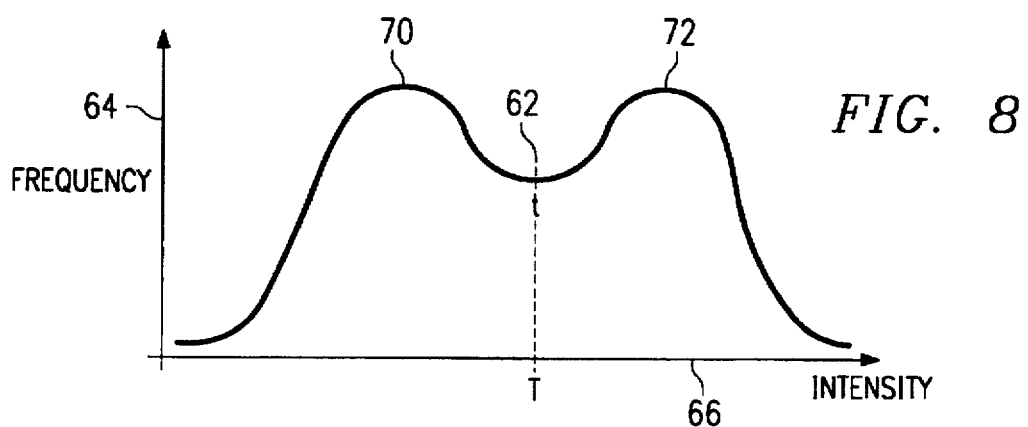
FIG. 8 shows a schematic diagram of a plot of the frequency of occurrence of Various intensities that may be perceived for the sample sites shown in FIG. 7.

FIG. 8 shows a typical histogram according to the present invention. Vertical axis 64 represents the frequency with which a specified intensity (specified on horizontal axis 66) occurs for a sampling of scope-of-view window 34 at predetermined number of sampling sites 68, e.g., nine sample sites 68 as shown in FIG. 7. The bimodal histogram of FIG. 8 develops because there are predominantly two basic images being viewed: the visual indicia and the background. The trough value (T) 62 may be used to predict whether a given area of the scope-of-view window represents the visual indicia or the background.

The trough value (T) 62 may be determined by first dividing scope-of-view window 34 into a predetermined number of sampling sites 68. The trough value for each sampling site 68 may be determined according to the equation:

$$Ti = \frac{\int_{y^0}^{y^0+C_h} \int_{x^0}^{x^0+\frac{C_h}{3}*C_g} f(x,y)dxdy}{\int_{y^0}^{y^0+C_h} \int_{x^0}^{x^0+\frac{C_h}{3}*C_g} dxdy} \quad (7)$$

The trough value (T) 62 is determined by interpolating from the trough values for the sampling sites 68 according to the equation:

$$T = at_{i-1} + (1-a)t_{i+1} \quad (8)$$

where $0 \leq a \leq 1$.

The next step in converting the visual image to primitives involves analyzing each character of identifier 20, but before doing so, it may be desirable in some circumstances to adjust alignment of the scope-of-view window 34 to account for skew that may be due to machine handling or random errors. This is accomplished at block 74 of FIG. 6 by considering the number of pixels shifted vertically between two nearby characters.

Figure 9:
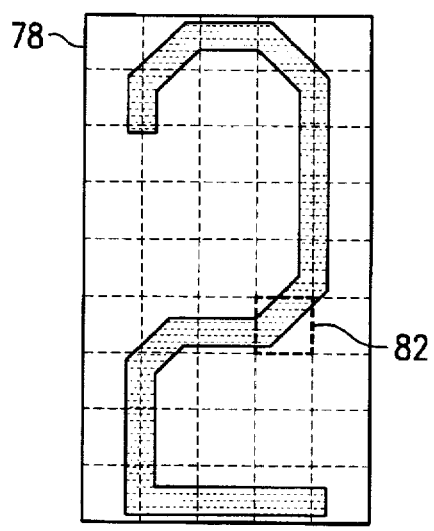
FIG. 9 is a schematic diagram showing a character window with the character "2" therein.

Each character of identifier 20 is considered one at a time (block 76 of FIG. 6) by focusing on each character with a character window 78. Referring to FIG. 9, character window 78 may then be divided into a predetermined number of smaller windows (block 80 of FIG. 6), which may be referred to as token windows 82. A representative token window 82 is shown in FIG. 9. The conversion to primitives proceeds for each token window 82 of character window 78 as indicated by loop 84 and decision point 86 of FIG. 6. Each token window 82 may be represented as a primitive which is either a "1" or a "0" according to criteria discussed below. The primitives for each character may thus be represented as an i*j array or matrix of zeros and ones. For example, character window 78 of FIG. 9 is shown divided into 45 token windows 82 and thus the character in window 78 may represented by a 5*9 matrix of zeros and ones.

Each token window 82 is analyzed to determine whether the appropriate primitive is a one or a zero. To make this determination the number of qualified pixels or bits is determined (block 92 of FIG. 6) for token window 82. A qualified pixel bears a specified relationship to trough value (T) 62; the typical relationship requires that the pixel have an intensity between Trough value (T) 62 and the most frequent intensity of visual image 72. A scaling value may be used to place less reliance on intensities that are near trough value 62, i.e., scaling value *T. The number of qualified pixels for window 82 is compared with a predetermined number, a threshold valve, (decision point 94 of FIG. 6), which may be a percentage of the number of pixels in a given token window 82. If, for example, the majority of pixels in a token window 82 are qualified pixels, the token window will be assigned (block 96 of FIG. 6) a primitive representing that visual indicia is primarily the contents of token window 82. If a "1" signifies that primarily visual indicia exists in window 82 and "0" signifies that primarily background exists in window 82, a "1" would be assigned the described token window 82.

Figure 10:
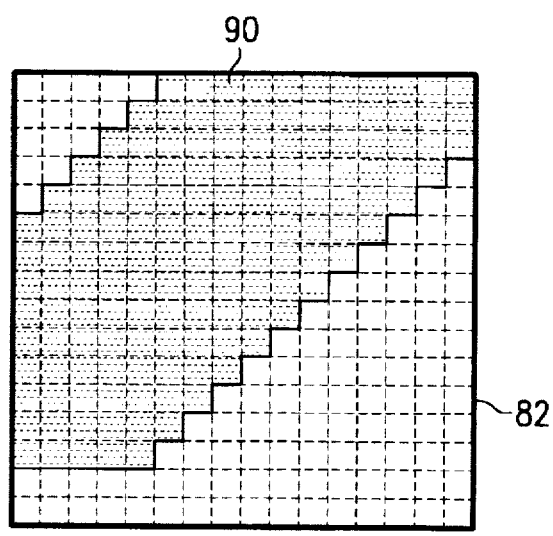
FIG. 10 is a schematic diagram of a token window for a portion of the character window shown in FIG. 9.

Consider token window 82 shown in FIG. 10. Token window 82 in this example has 256 pixels (16×16). Suppose that each of darkened pixels 90 has an intensity corresponding approximately to region 72 on the histogram of FIG. 8. Say that the relationship required for a pixel to be a qualified pixel is that the pixel have an intensity greater than 1.2 *T and assume that the intensity of 72 is greater than 1.2 T so that all the darkened pixels of FIG. 10 are qualified pixels. Approximately 146 of the 256 pixels in token window 82 of FIG. 10 are qualified. Then assume the predetermined number to which the qualified pixels is compared is half the number of pixels in token window 82. Thus, because 146 is greater than 128, the conclusion is reached that the token window is primarily visual indicia and a "1" is assigned for the primitive representing this token window (block 96 of FIG. 6). If less qualified pixels existed in window 82 than the predetermined number, a "0" would have been assigned (block 98 of FIG. 6). This process is repeated for each token window 82 of the character of visual indicia 20 until all token windows 82 are considered and the character in character window 78 is represented as a matrix of ones and zeros, i.e., as image primitives. The conversion of the visual indicia to image primitives is then complete (block 88 of FIG. 6).

Figure 11:
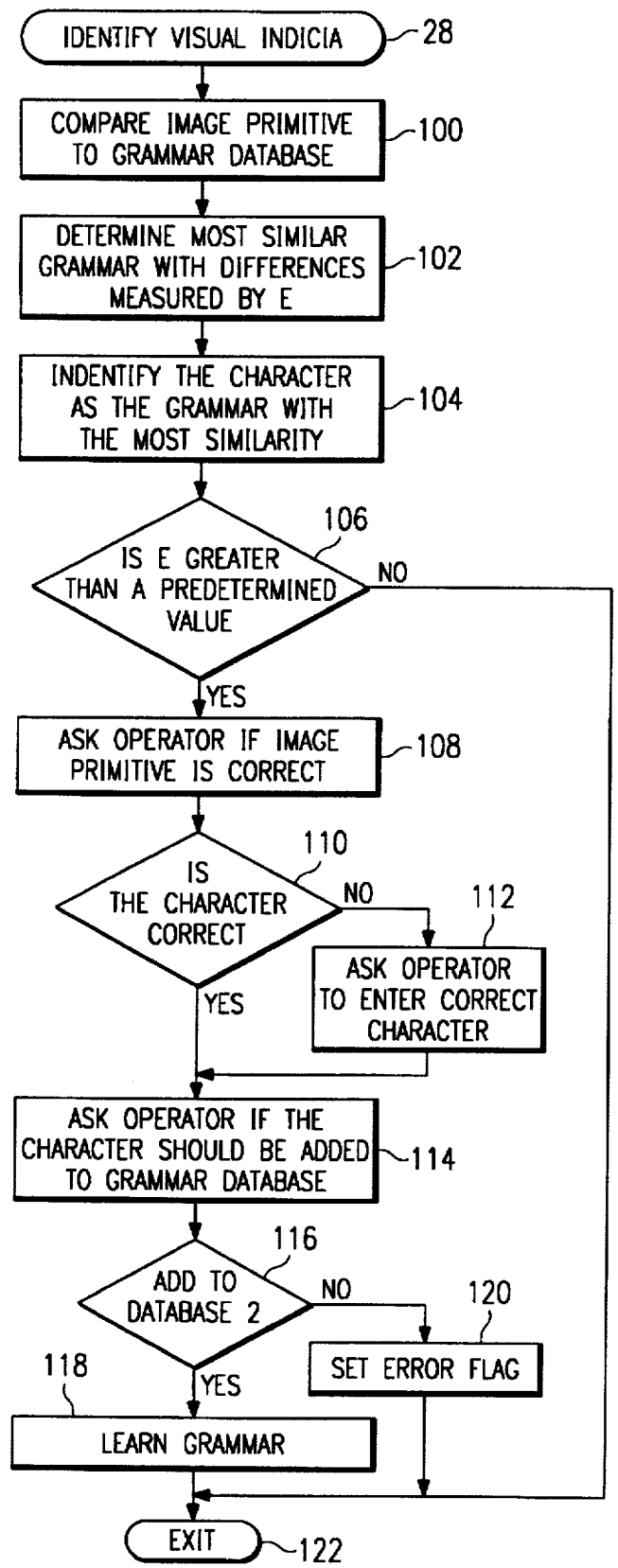
FIG. 11 is a block diagram showing the steps that may be used to identify the visual indicia in accordance with the present invention.

The next basic step (block 28 of FIG. 2) is to identify the character or visual indicia 20. FIG. 11 shows the flow of steps that may be used to identify visual indicia 20. At this point, the contents of character window 78 are now represented as image primitives, P, in the form of an i*j matrix. To identify the character represented by the image primitives, P, the primitives P are compared with a plurality of known visual indicia that have been represented as primitives. The plurality of known visual indicia form a token grammar database. Each grammar, $G_i$, is a known visual indicia, such as a character, that is represented as an i*j matrix of primitives: zeros or ones according to the scheme and matrix format discussed above.

At this point, the grammar of the grammar database that is most similar to the image primitives of visual indicia 20 may be determined by comparing the image primitives with each grammar in the data base (block 100 of FIG. 11). A binary add is used to calculate an error count, E, for each comparison, and then the comparison having the least error is determined (block 102 of FIG. 11), and the grammar with the least error is identified as the indicia (block 104 of FIG. 11). Thus, if the grammar database is defined as $$G = \{G^{(\cdot)}, G^{(-)}, G^{(0)}, G^{(1)}, \ldots G^{(9)}, G^{(A)}, G^{(B)}, \ldots G^{(Z)}\}$$

where the superscript shows the visual indicia represented in that set of tokens as primitives, then the identity of the character C in the character window 78, which has been represented by a primitive matrix P, would be C=G(c)|min$_c$ E(P,G(c)), where E is the error function defined as $$E(P, G_c) = \sum_{i,j} \overline{(P_{ij} \oplus g_{ij})} * W_{ij} \quad (9)$$

where W is a weighting function to account for areas where the character information is less reliable. The error function keeps a count of the number of differences between each comparison. The weighing function may be defined as $$W_{ij} = \begin{cases} 0.5 & \text{if } (g_{i,j+1} + g_{i+1,j} + g_{i,j-1} + g_{i-1,j}) > 2 \text{ and } p_{ij} = 1 \\ 1 & \text{otherwise} \end{cases} \quad (10)$$

For a simplified example, suppose P is 1*3 matrix: P=[1 0 1]and the grammar database, G, contains two characters $G^{(1)}$=[1 1 1]and $G^{(2)}$=[0 1 0]. Then the comparisons would be as follows: perform binary add of P and $G^{(1)}$:

```
P            =  1  0  1
G⁽¹⁾         =  1  1  1
binary add   =  0  1  0  =  1
``` perform binary add for P and $G^{(2)}$:

```
P            =  1  0  1
G⁽²⁾         =  0  1  0
binary add   =  1  1  1  =  3
```

$E(P, G^{(1)}) = 1 * W_{ij}$ $E(P, G^{(2)}) = 3 * W_{ij}$

Thus, because $[E(P,G^{(1)})=1*W_{ij}] < [E(P,G^{(2)})=3*W_{ij}]$, it is clear that $G^{(1)}$ has the better match and character C would be identified as the numeral "1" assuming the error function was less than a predetermined value, a maximum error value.

There may be occasions, however, where the best match of the image primitives and the grammar primitives in the grammar database are not acceptable. To determine when this case exists, the error of the best match is considered and compared with a predetermined number, the maximum error value (decision point 106 of FIG. 11). If the error is greater than the predetermined limit, the operator may be asked if the character identification is correct (blocks 108 and 110 of FIG. 11). If the identification is not correct, the operator may be asked to enter the correct identification of the character (block 112 of FIG. 11).

The operator may then choose (blocks 114 and 116 of FIG. 11) to have the images primitives learned (block 118 of FIG. 11). To learn the indicia, the image primitives associated with visual indicia identified by the operator may be saved as an additional set of grammar tokens for that character in the grammar database, i.e, $G^{(c^*)}$=P (where C* indicates that the grammar is an additional set of tokens or primitives representing character C). This procedure allows new grammar sets to be learned to meet new situations. If the operator chooses to not have the image primitive added to the grammar database, an error flag (block 120 of FIG. 11) may be set to indicate that the error was greater than the predetermined maximum error value. The identification of the character or portion of the visual indicia is now complete (block 122 of FIG. 11). An output signal is then generated that corresponds to the identified indicia or character. The output signal may be used to display the character or to transmit the character's identification as input to another machine. The basic steps 26 through 28 are repeated for each character window 78.

Referring to FIG. 3, the process steps of FIG. 2 may be accomplished by an apparatus that has a camera 31 for capturing the visual image; a video-to-digital converter 33 which is associated with the camera 31 for converting the visual image into a digital image; and a computing means 35 that is operable to perform with software steps 24 through 30 of FIG. 2 to produce an output signal 37. A coupler (not shown) may be incorporated to allow output signal 37 to be delivered to other machinery.

Although the present invention has been described in detail, it should be understood that various changes, substitutions and alterations can be made without departing from the spirit and scope of the invention as defined by the following claims.

What is claimed is:

1. A method for identifying visual indicia on a surface comprising the steps of:

capturing a visual image of a scope-of-view window containing the visual indicia as a digital image;

isolating the visual indicia on the digital image;

converting the isolated visual indicia on the digital image to image primitives;

said step of converting the isolated visual indicia on the digital image to image primitives comprising the steps of:

determining an intensity trough value for the digital image;

dividing the scope-of-view window into a predetermined number of token windows;

determining the number of qualified pixels having an intensity value above said trough value in each token window; and comparing the number of qualified pixels in each token window to a predetermined threshold value and assigning a primitive value of "1" for each token window having more qualified pixels in the token window than a predetermined threshold value and assigning "0" for each token window having less qualified pixels than the predetermined threshold value; and comparing the image primitives to a plurality of sets of grammar primitives each corresponding to known visual indicia to find the known visual indicia that is most similar to the visual indicia of the visual image.

2. The method of claim 1, wherein the step of comparing the image primitives to a plurality of grammar primitives comprises the steps of:

comparing the image primitives to each of a plurality of sets of grammar primitives in a grammar database;

maintaining an error count of the number of differences between each comparison of grammar primitives to the image primitives; and identifying the visual indicia as the known visual indicia having grammar primitives most similar to the image primitives.

3. The method of claim 1, further comprising producing a signal representing the known visual indicia associated with grammar primitives having the fewest differences to the image primitives for the plurality of grammar primitives.

4. The method of claim 1, further comprising the step of learning new grammar primitives by defining the image primitives as a new set of grammar primitives in response to input by an operator.

5. The method of claim 1 wherein said step of determining an intensity trough value for the digital image comprises the steps of:

dividing said scope-of-view window into a predetermined number of sampling sites;

determining the trough value for each sampling site; and interpolating said trough value from said sampling sites.

6. A method for identifying visual indicia on a surface comprising the steps of:

capturing a visual image of a scope-of-view window containing the visual indicia as a digital image;

isolating the visual indicia on the digital image;

converting the isolated visual indicia on the digital image to image primitives;

said step of converting the isolated visual indicia on the digital image to image primitives comprises the steps of:

determining an intensity trough value for the digital image;

performing a skew adjustment;

dividing the scope-of-view window into a predetermined number of token windows;

determining the number of qualified pixels having an intensity value above said trough value in each token window; and comparing the number of qualified pixels in each token window to a predetermined threshold value and assigning a primitive value of "1" for each token window having more qualified pixels in the token window than the predetermined threshold value and assigning "0" for each token window having less qualified pixels than the predetermined threshold value; and comparing the image primitives to a plurality of sets of grammar primitives each corresponding to known visual indicia to find the known visual indicia that is most similar to the visual indicia of the visual image.

7. A method of identifying visual characters against a noisy background on a a surface comprising the steps of:

capturing a video image of a scope-of-view window containing the characters;

converting the video image to a digital image by using a video-to-digital converter;

isolating the visual characters on the digital image;

converting the visual characters to image primitives comprising the steps of:

determining an intensity trough value for the digital image;

dividing each visual character into a predetermined number of token windows;

determining the number of qualified pixels having an intensity value above said trough value in each token window; and comparing the number of qualified pixels in each token window to a predetermined threshold value and assigning a primitive value of "1" for each token window having more qualified pixels in the token window than the predetermined threshold value and assigning "0" for each token window having less qualified pixels than the predetermined threshold value; and comparing the image primitives for each character to a plurality of sets of grammar primitives in a grammar database containing known characters to determine the known character whose grammar primitives are least different from the image primitives of each character; and identifying each visual character with the known character whose grammar primitives were least different from the image primitives.

8. The method of claim 7 including after the step of determining an intensity trough value the step of performing a skew adjustment.

9. The method of claim 7, further comprising the step of producing an output signal corresponding to the characters whose grammar primitives were least different from the image primitives.

* * * * *